US008055602B2

(12) United States Patent
Tirpak et al.

(10) Patent No.: US 8,055,602 B2
(45) Date of Patent: Nov. 8, 2011

(54) METHOD AND SYSTEM FOR CUSTOMIZATION OF A GRAPHICAL USER INTERFACE (GUI) OF A COMMUNICATION DEVICE IN A COMMUNICATION NETWORK

(75) Inventors: Thomas M. Tirpak, Glenview, IL (US); Trent J. Miller, West Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 759 days.

(21) Appl. No.: 12/142,004

(22) Filed: Jun. 19, 2008

(65) Prior Publication Data

US 2009/0319462 A1 Dec. 24, 2009

(51) Int. Cl.
*G06F 17/00* (2006.01)
*G06N 5/02* (2006.01)
(52) U.S. Cl. ............................................. 706/47
(58) Field of Classification Search .................. 706/47
See application file for complete search history.

(56) References Cited

U.S. PATENT DOCUMENTS

| | | | |
|---|---|---|---|
| 6,502,213 B1 | 12/2002 | Bowman-Amuah | |
| 6,636,242 B2 | 10/2003 | Bowman-Amuah | |
| 6,640,249 B1 | 10/2003 | Bowman-Amuah | |
| 7,062,299 B2 * | 6/2006 | Choi | 455/566 |
| 7,167,844 B1 | 1/2007 | Leong et al. | |
| 7,590,128 B2 * | 9/2009 | Upp et al. | 370/401 |
| 7,852,838 B2 * | 12/2010 | Miller et al. | 370/389 |
| 7,853,280 B2 * | 12/2010 | Sadiq et al. | 455/518 |
| 2007/0271522 A1 | 11/2007 | Son et al. | |

FOREIGN PATENT DOCUMENTS

| | | |
|---|---|---|
| EP | 1524589 A1 | 4/2005 |
| JP | 11203000 A | 7/1999 |
| KR | 1020040107930 A | 12/2004 |
| KR | 1020060081819 A | 7/2006 |
| WO | 0116728 A2 | 3/2001 |
| WO | 2005067393 A2 | 7/2005 |

OTHER PUBLICATIONS

Jeong, Jae Woo: "The International Search Report and the Written Opinion of the International Searching Authority, or the Declaration", Korean Intellectual Property Office, Daejeon, Republic of Korea, completed Dec. 22, 2009, mailed: Dec. 23, 2009.

* cited by examiner

*Primary Examiner* — Michael B Holmes (57) ABSTRACT

A method and system is provided for customization of a graphical user interface (GUI) of a communication device in a communication network. The method includes customization of the GUI of the communication device based on one or more of user preferences and user interaction patterns pertaining to a plurality of services accessed by a user of the communication device. The method further comprises customization of the GUI of the communication device based on a predefined set of rules.

19 Claims, 8 Drawing Sheets

METHOD AND SYSTEM FOR CUSTOMIZATION OF A GRAPHICAL USER INTERFACE (GUI) OF A COMMUNICATION DEVICE IN A COMMUNICATION NETWORK

FIELD OF THE INVENTION

The present invention generally relates to the field of a communication network. More specifically, the present invention relates to personalization of a graphical user interface (GUI) of a communication device in the communication network.

BACKGROUND OF THE INVENTION

In a communication network, a user uses a GUI of a communication device to access a plurality of services. The plurality of services is provided by one or more of a communication service provider, a mobile virtual network operator (MVNO) and a third party service provider. The plurality of services may be a video call, a voice call, text messaging, multimedia messaging, digital content access and downloading, internet access and various data applications.

The user may have preferred services that are accessed more frequently as compared to other services. The user may access the preferred services among the plurality of services provided by the communication service provider on the GUI of the communication device. Also, the user may exhibit a unique pattern of interaction while accessing the plurality of services.

Presently, the GUI of the communication device is predefined by a manufacturer of the communication device, often with guidance from the communication service provider supplied to the manufacturer. Also, the manufacturer of the communication device may enable customizing aesthetics (look and feel) of the GUI and creating shortcuts, hot keys or ready list for a set of preferred services.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and system components for customization of a graphical user interface (GUI) of a communication device in a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the present invention described herein may be comprised of one or more conventional transaction-clients and unique stored program instructions that control the one or more transaction-clients to implement, in conjunction with certain non-transaction-client circuits, some, most, or all of the functions of a method of guided personalization of a Graphical User Interface (GUI). In accordance with various embodiments of the invention the method of guided personalization of the GUI include monitoring user interaction with one or more services and analyzing patterns of user interaction with the one or more services. Thereafter, the method applies one or more of a predefined set of rules, analytical models and empirical (input-output) models to personalize the GUI. A personalized GUI thus obtained, is communicated to one or more devices of the user. The non-transaction-client circuits may include, but are not limited to, a radio receiver, a radio transmitter, signal drivers, clock circuits, power source circuits, and user input devices. As such, these functions may be interpreted as steps of methods of guided personalization of user interfaces. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the present invention provides a method and system for customization of a GUI of a communication device in a communication network. A user accesses a plurality of services on the GUI of the communication device. The plurality of services is provided by one or more of a communication service provider, a mobile virtual network operator (MVNO) and a third party service provider. The plurality of services can be, for example, but not limited to, a voice call, text messaging, multimedia messaging, digital content access and downloading, internet access and various data applications. The user may access one or more services more frequently as compared to other services. Also, the user may exhibit a unique interaction pattern while interacting with the one or more services of the plurality of services. Therefore, user preferences and user interaction patterns pertaining to the plurality of services accessed by the user of the communication device are analyzed. Based on analysis and a predefined set of rules, the GUI of the communication device is customized.

Figure 1:
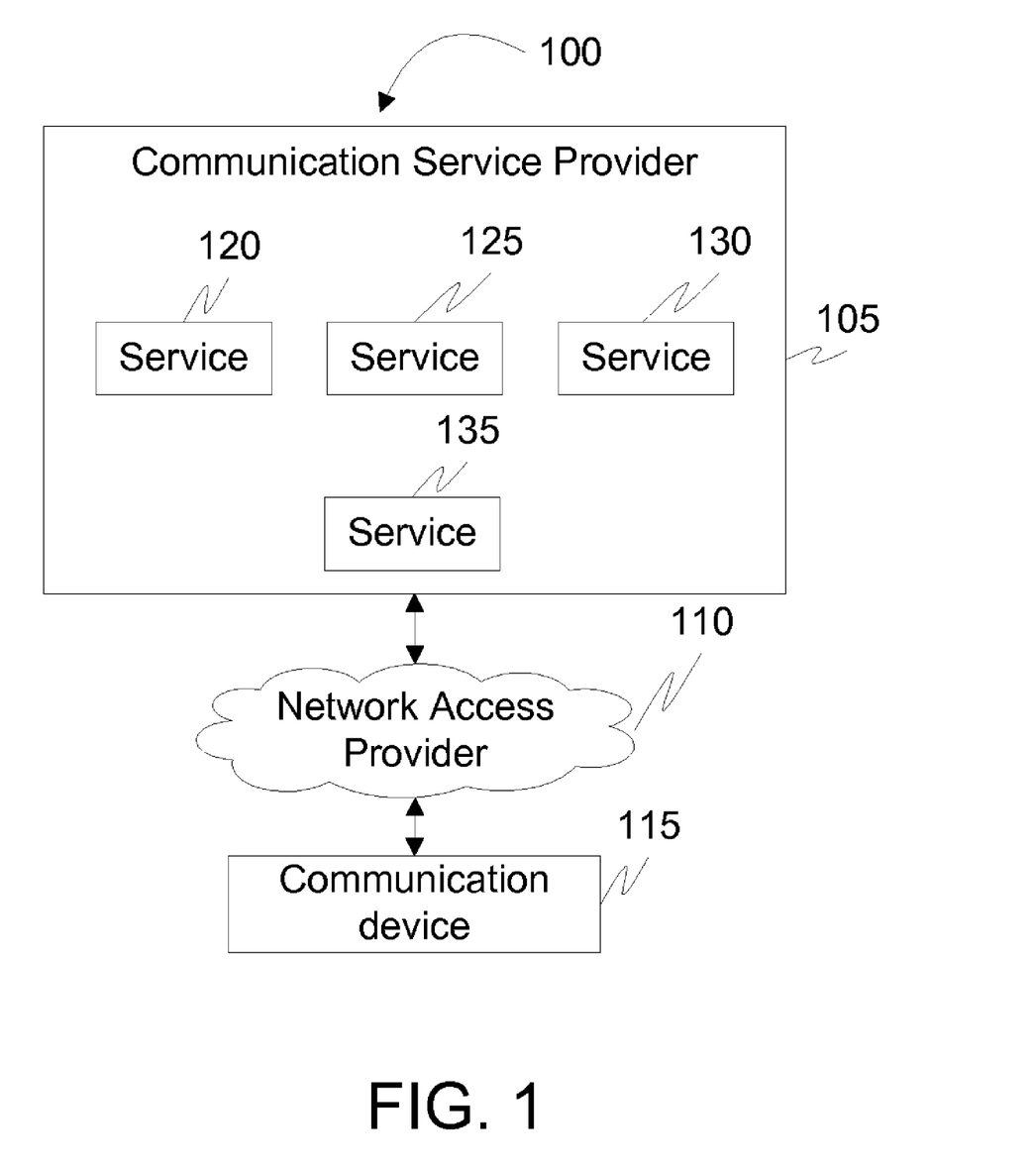
FIG. 1 is a block diagram showing an exemplary environment in which various embodiments of the present invention can function.

Referring to the drawings and in particular to FIG. 1, an environment 100 in which various embodiments of the present invention can function is shown. The environment 100 includes a communication service provider 105, a network access provider 110 and a communication device 115. The communication service provider 105 provides a plurality of services to the communication device 115. Although the FIG. 1 depicts the communication service provider 105 as the provider of the plurality of services, it would be apparent to a person skilled in the art that the plurality of services can be provided by one or more of a communication service provider, a mobile virtual network owner (MVNO) (not shown in the figure) and a third party service provider (not shown in the figure). The plurality of services provided by the communication service provider 105 can be, for example, but not limited to a voice call, text messaging, multimedia messaging, digital content access and downloading, internet access and various data applications. The plurality of services provided by the communication service provider 105 is depicted as a first service 120, a second service 125, a third service 130 and a fourth service 135 for illustration purpose. The user accesses one or more of the first service 120, the second service 125, the third service 130 and the fourth service 135 on the GUI of the communication device 115 through the network access provider 110. The network access provider 110 can be, for example, but not limited to, a Global System for Mobile communication (GSM) system, a Code Division Multiple Access (CDMA) system, a Wireless Local Area Network (WLAN), a Local Area Network (LAN), a radio network, an Universal Mobile Telecommunication System (UMTS), a Worldwide Interoperability for Microwave Access (WiMax) system, a Wireless Fidelity (WiFi) system and a Long-Term Evolution (LTE) system. The communication device 115 can be public or private devices, for example, but not limited to, a cellular phone, a Personal Digital Assistant (PDA), a laptop computer, a public safety device, a data modem, and other type of communication devices. Although, FIG. 1 includes only one communication service provider and one communication device, a person skilled in art will appreciate that there may be any number of communication service providers and communication devices.

Figure 2:
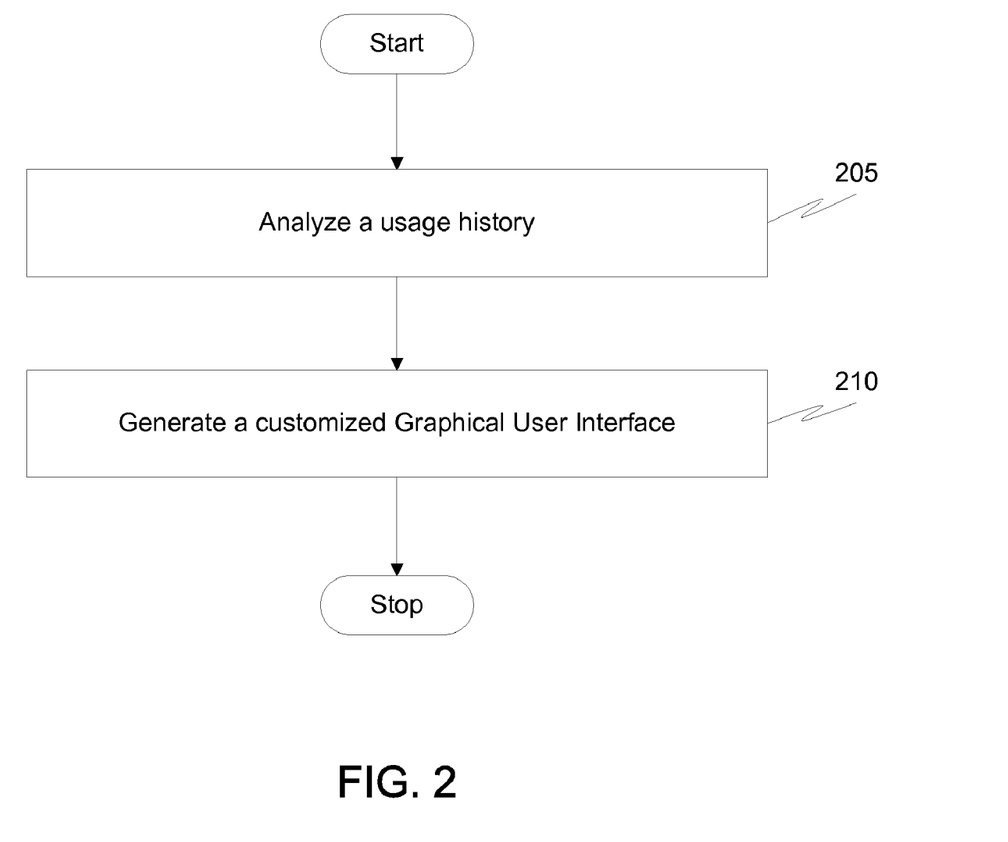
FIG. 2 illustrates a flow diagram for a method for customization of a graphical user interface (GUI) of a communication device in a communication network in accordance with an embodiment of the present invention.

Turning now to FIG. 2, a flow diagram for customization of the GUI of the communication device 115 is shown in accordance with an embodiment of the present invention. The user accesses the services 120-135 provided by the communication service provider 105 on the GUI of the communication device 115. The user may have preferred services, which are by definition a subset of available services that are accessed more frequently as compared to other services. The preferred services may be characterized in terms of their service ID and/or one or more attributes of their form, such as selection lists and text input box and function such as composing a message and sending the message. The user may prefer to make a voice call to a person rather than sending a multimedia message to a person.

The user may also exhibit a distinct interaction pattern corresponding to the services 120-135 accessed by the user on the GUI of the communication device 115. Interaction patterns may be considered distinct, or representative, for a particular user for a particular service or type of service, as characterized by the form and/or functional attributes of the available services. The functional attributes of the available services includes for example, but not limited to, text presentation, image presentation, sound presentation, haptic presentation, user behaving model and task orientation. Distinct interaction patterns may serve to predict the likely interaction of the user (or group of users) with a given service within certain temporal and/or task contexts. In another embodiment, the distinct interaction pattern refers to distinctions among users, which would indicate the need to modify certain elements of the GUI when another user accesses the given service. The user, for instance, while text messaging may use pre-composed default messages more frequently than composing messages by himself.

As the user accesses the services 120-135 provided by the communication service provider 105, a usage history corresponding to the services 120-135 accessed by the user of the communication device 115 is tracked. The usage history may include, but not limited to, a plurality of user interaction patterns corresponding to the services 120-135 accessed by the user and a plurality of user preferences corresponding to the services 120-135 accessed by the user on the GUI of the communication device 115. The plurality of user interaction patterns can include for example, collection of services used before/after and during display of a particular instance of GUI screen and an average waiting time for a user's reaction to a prompt produced by the GUI.

Upon tracking, the usage history corresponding to the services 120-135 is stored in one or more database corresponding to the services 120-135. Further, the usage history corresponding to the services 120-135 stored in the one or more database corresponding to the services 120-135 is updated periodically. The usage history can be updated automatically in a predefined periodic interval, or in response to a prompt of the user and/or the communication service provider 105.

In order to customize the GUI of the communication device 115, the usage history is analyzed 205. In an embodiment of the present invention, the usage history is analyzed by the communication service provider 105. The usage history is analyzed to identify and establish the distinct interaction pattern corresponding to the services 120-135 accessed by the user and one or more of preferred services which are accessed more often by the user. This facilitates in customizing the GUI such that it is optimized for easy and quick access to each of the services 120-135. For example, the user of the communication device 115 spends more time accessing online services on the communication device 115 as compared to other services provided by the communication service provider 105. The communication service provider 105 may analyze time spent by the user on various services provided by the communication service provider 105 and can configure the GUI such that the online services are easily accessible to the user on the GUI. The analyzing step is further explained in FIG. 3.

Thereafter, a customized GUI is generated 210 based on analyzing of the usage history corresponding to the services 120-135 accessed by the user. The customized GUI is further modified based on a predefined set of rules. The predefined set of rules may include, but not limited to, one or more of a set of rules specified by the manufacturer of the communication device 115, a set of rules specified by the communication service provider 105, a set of rules specified by a third party service provider hosting one or more of the services 120-135, a set of rules specified by the network access provider 110 and a set of rules specified by the user of the communication device 115. The predefined set of rules specified by the manufacturer of the communication device 115 may include constraints regarding modification of one or more items of the GUI of the communication device 115. The one or more items may include a set of types of skins that can be applied to the GUI of the communication device 115, a logo of the manufacturer that can/cannot be removed from the GUI of the communication device 115, and organization/hierarchy of a menu displayed on the GUI of the communication device 115. In an embodiment, the predefined set of rules specified by the communication service provider 105 may include a logo of the communication service provider 105 that can/cannot be removed from the GUI of the communication device 115 and placement of priority services from the services 120-135 provided by the communication service provider 105 in the organization/hierarchy of the menu displayed on the GUI of the communication device 115.

In an embodiment, the set of rules specified by the user of the communication device 115 for example, may be one of, but not limited to, emphasizing the preferred services accessed by the user in the menu on the GUI of the communication device 115, providing a detailed command descriptions and help for the services 120-135 accessed by the user based on the user expertise level, and de-emphasizing the services 120-135 from the menu for which resources have become scarce. For example, if the user has exhausted a monthly allocation of "Anytime Minutes" for a given month, a network management entity detects this condition, and the GUI is modified such that the voice call option is automatically de-emphasized in the menu displayed on the GUI of the communication device 115. In another example, the network management entity may identify a resource utilization spike, as might occur when a fan enters a sports stadium, the GUI is modified such that a text-messaging application is prominently displayed.

Upon generation of the customized GUI, the user of the communication device 115 may be prompted to download the customized GUI. The customized GUI may be transmitted upon request by the user of the communication device 115. In an embodiment, the customized GUI may be automatically transmitted to the communication device 115 and applied to the communication device 115, i.e., activated. In another embodiment, the user may be allowed to download the customized GUI on a simulation environment, such as, a desktop, for the purpose of testing the customized GUI before activating it on the communication device 115.

In an embodiment of the invention, the communication device 115 may itself adapt the GUI, via an Adaptive User Interface (AUI) engine. The AUI engine records and observes the usage history along with the predefined set of rules so as to modify the GUI such that the GUI obeys all existing constraints.

Figure 3:
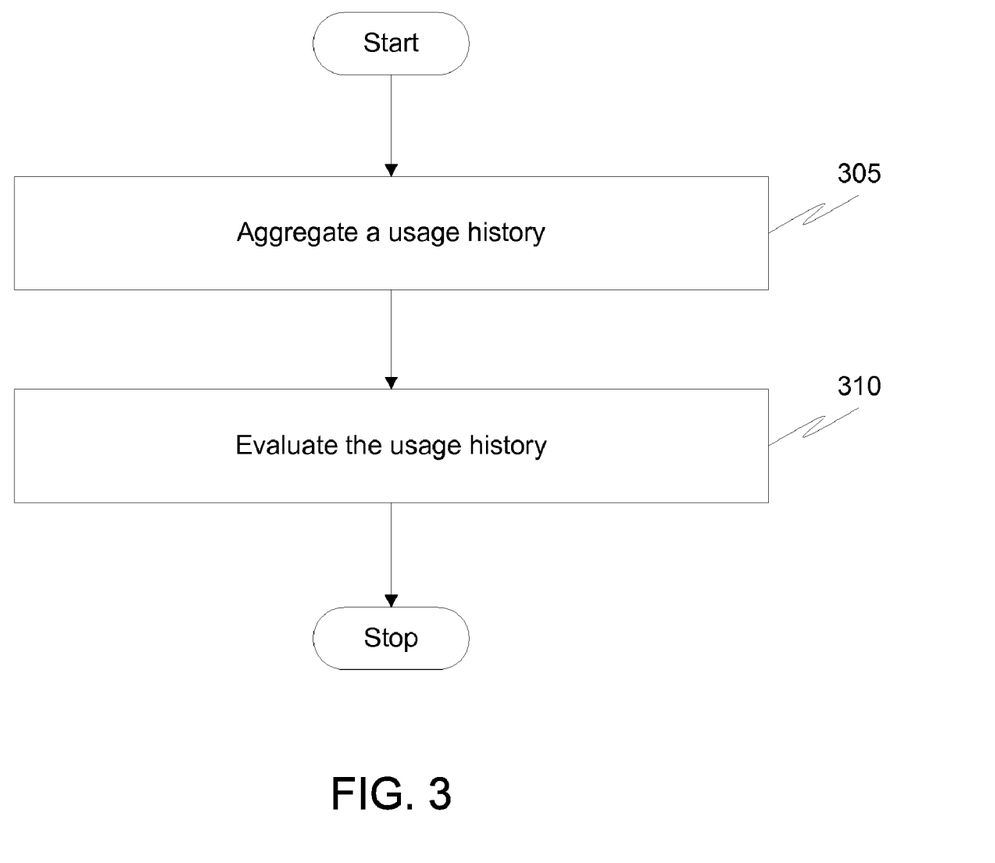
FIG. 3 illustrates a flow diagram for analyzing a usage history corresponding to a plurality of services accessed by a user of a communication device in accordance with an embodiment of the present invention.

Turning now to FIG. 3, a flow diagram for analyzing the usage history corresponding to the services 120-135 accessed by the user of the communication device 115 is shown in accordance with an embodiment of the present invention. As explained in conjunction with FIG. 2, the usage history corresponding to the services 120-135 accessed by the user is tracked and stored in the one or more database corresponding to the services 120-135. In an embodiment of the present invention, the usage history corresponding to a service may be stored in a separate database corresponding to the service. The usage history corresponding to the services 120-135 stored in the one or more database corresponding to the services 120-135 is aggregated 305 for obtaining an aggregated usage history. The aggregated usage history represents user activity at a plurality of temporal intervals defined by the communication service provider 105. In an embodiment of the present invention, the communication service provider 105 maintains statistics of the usage history corresponding to the services 120-135 accessed by the user of the communication device 115. The statistics corresponding to the services 120-135 is aggregated so as to analyze user behavior and access pattern across the services 120-135 for generating the customized GUI that is optimized for easy and quick access to each of the services 120-135. The aggregated usage history is stored in an aggregated database. The aggregated usage history stored in the aggregated database may be automatically refreshed in response to an update of the usage history corresponding to the services 120-135 stored in the one or more database corresponding to the plurality of services.

Thereafter, the aggregated usage history is evaluated 310 in order to customize the GUI of the communication device 115. The aggregated usage history can be evaluated by the communication service provider 105. Also, the aggregated usage history can be evaluated by a dedicated server. The dedicated server can be owned by the communication service provider 105 or can be provided by a data analysis service provider. The aggregated usage history can directly be transferred to the communication service provider 105 or to the dedicated server for the purpose of evaluation. Further, the communication service provider 105 or the dedicated server may request for the aggregated usage history on a predefined periodic interval. A plurality of mathematical and statistical operations are performed on the aggregated usage history. In an exemplary embodiment of the present invention, statistical analysis is performed to obtain average, mean, median and variance for the aggregated usage history. Thereafter, result of the statistical operations is evaluated along with the set of predefined rules, predefined standards and threshold conditions as defined by the communication service provider 105. Accordingly, the results are used to customize the GUI of the communication device 115.

Figure 4:
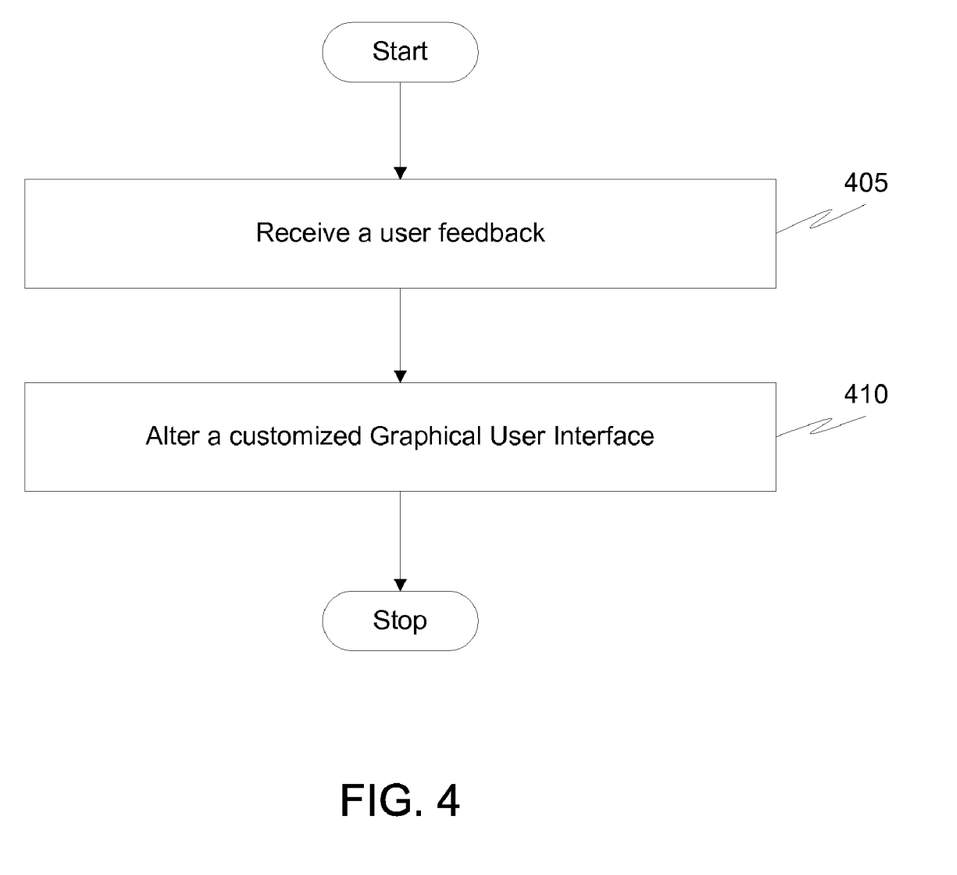
FIG. 4 illustrates a flow diagram for generating a customized GUI of a communication device in accordance with an embodiment of the present invention.

Turning now to FIG. 4, a flow diagram for generating the customized GUI based on analyzing the usage history corresponding to the services 120-135 accessed by the user of the communication device 115 is shown in accordance with an embodiment of the present invention. Upon analyzing the usage history, the communication service provider 105 generates the customized GUI based on the results of the evaluation of the aggregated usage history. As explained in conjunction with FIG. 2, the customized GUI is further modified based on a predefined set of rules. The predefined set of rules may include, but not limited to, one or more of a set of rules specified by the manufacturer of the communication device 115, a set of rules specified by the communication service provider 105, a set of rules specified by the network access provider 110 and a set of rules specified by the user of the communication device 115. The predefined set of rules specified by the manufacturer of the communication device 115 may include constraints regarding modification of one or more items of the GUI of the communication device 115. The customized GUI is transmitted to the user of the communication device 115. The user may accept or reject the customized GUI based on user's expectations and requirements of the GUI. The user may also provide feedback or propose changes to the customized GUI to meet the user's expectations and requirements. Therefore, user feedback is received 405 corresponding to the customized GUI. Thereafter, the customized GUI is altered 410 based on one or more of the user feedback and the predefined set of rules. Upon alteration of the customized GUI, the user is prompted again for the customized GUI. The customized GUI is then transmitted to the communication device 115 or made available for the user to download.

Figure 5:
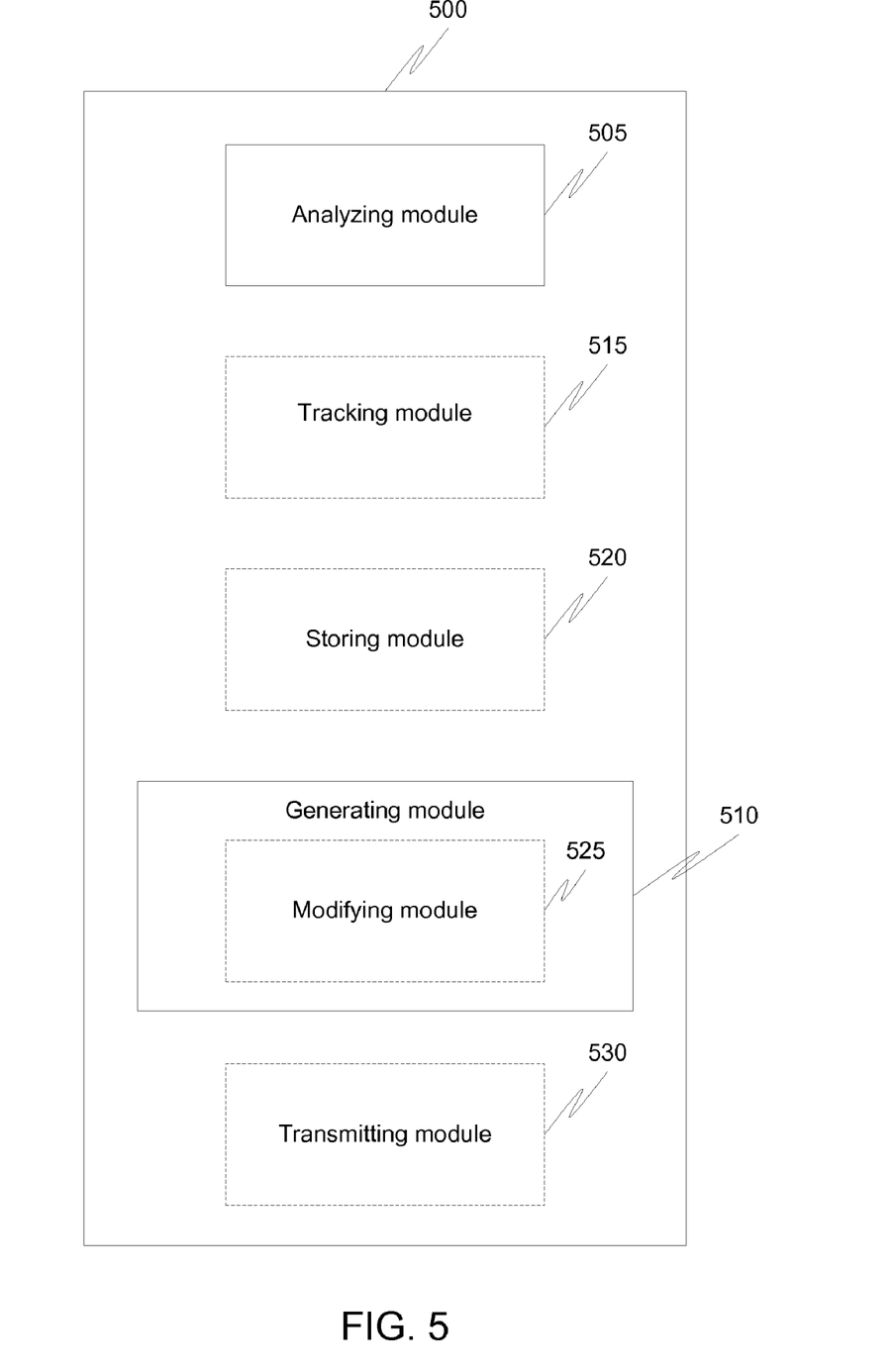
FIG. 5 illustrates a block diagram for a system for customization of a GUI of a communication device in a communication network in accordance with an embodiment of the present invention.

FIG. 5 illustrates a block diagram for a system 500 for customization of the GUI of the communication device 115 in accordance with an embodiment of the present invention. The system 500 includes an analyzing module 505 and a generating module 510. The user accesses the services 120-135 provided by one or more of the communication service provider 105, a mobile virtual network operator (MVNO) and a third party service provider on the GUI of the communication device 115. The user may have the preferred services, which are by definition a subset of available services that are accessed more frequently as compared to other services. The preferred services may be characterized in terms of their service ID and/or one or more attributes of their form, such a selection lists and text input box and function such as composing a message and sending the message. The user of the communication device 115 accesses the preferred services among the services 120-135 provided by the communication service provider 105. The user may also exhibit a distinct interaction pattern corresponding to the services 120-135 accessed by the user on the GUI of the communication device 115. Interaction patterns may be considered distinct, or representative, for a particular user for a particular service or type of service, as characterized by the form and/or functional attributes of the available services. The functional attributes of the available services includes for example, but not limited to, text presentation, image presentation, sound presentation, haptic presentation, user behaving model and task orientation. Distinct interaction patterns may serve to predict the likely interaction of the user (or group of users) with a given service within certain temporal and/or task contexts. In another embodiment, the distinct interaction pattern refers to distinctions among users, which would indicate the need to modify certain elements of a GUI when a new (distinct) user accesses the given service. As the user accesses the services 120-135 provided by the communication service provider 105, the usage history corresponding to the services 120-135 using the communication device 115 is analyzed by the analyzing module 505. The usage history may include, but not limited to, a plurality of user interaction patterns corresponding to the services 120-135 accessed by the user and a plurality of user preferences corresponding to the services 120-135 accessed by the user on the GUI of the communication device 115. The plurality of user interaction patterns can include for example, collection of services used before/after and during display of a particular instance of GUI screen and an average waiting time for a user's reaction to a prompt produced by the GUI. The system 500 further includes a tracking module 515. The tracking module 515 tracks the usage history corresponding to the services 120-135 accessed by the user. The usage history tracked by the tracking module 515 is stored in a storing module 520 of the system 500. The analyzing module 505 is further explained in conjunction with FIG. 6.

Thereafter, the generating module 510 generates the customized GUI based on analyzing the usage history by the analyzing module 505. The generating module 510 further includes a modifying module 525. The modifying module 525 modifies the customized GUI based on the predefined set of rules. The predefined set of rules may include one or more of a set of rules specified by the manufacturer of the communication device 115, a set of rules specified by the communication service provider 105, a set of rules specified by a third party service provider hosting one or more of the services 120-135, a set of rules specified by the network access provider 110 and a set of rules specified by the user of the communication device 115. Upon generating the customized GUI, a transmitting module 530 transmits the customized GUI to the communication device 115. In another embodiment, the user may be allowed to download the customized GUI on a simulation environment, such as, a desktop, for the purpose of testing the customized GUI before activating it on the communication device 115. The user of the communication device 115 may be prompted to authorize transmission of the customized GUI to the communication device 115. The customized GUI may be transmitted upon request by the user of the communication device 115. In an embodiment, the customized GUI may be transmitted on to the communication device 115 automatically.

Figure 6:
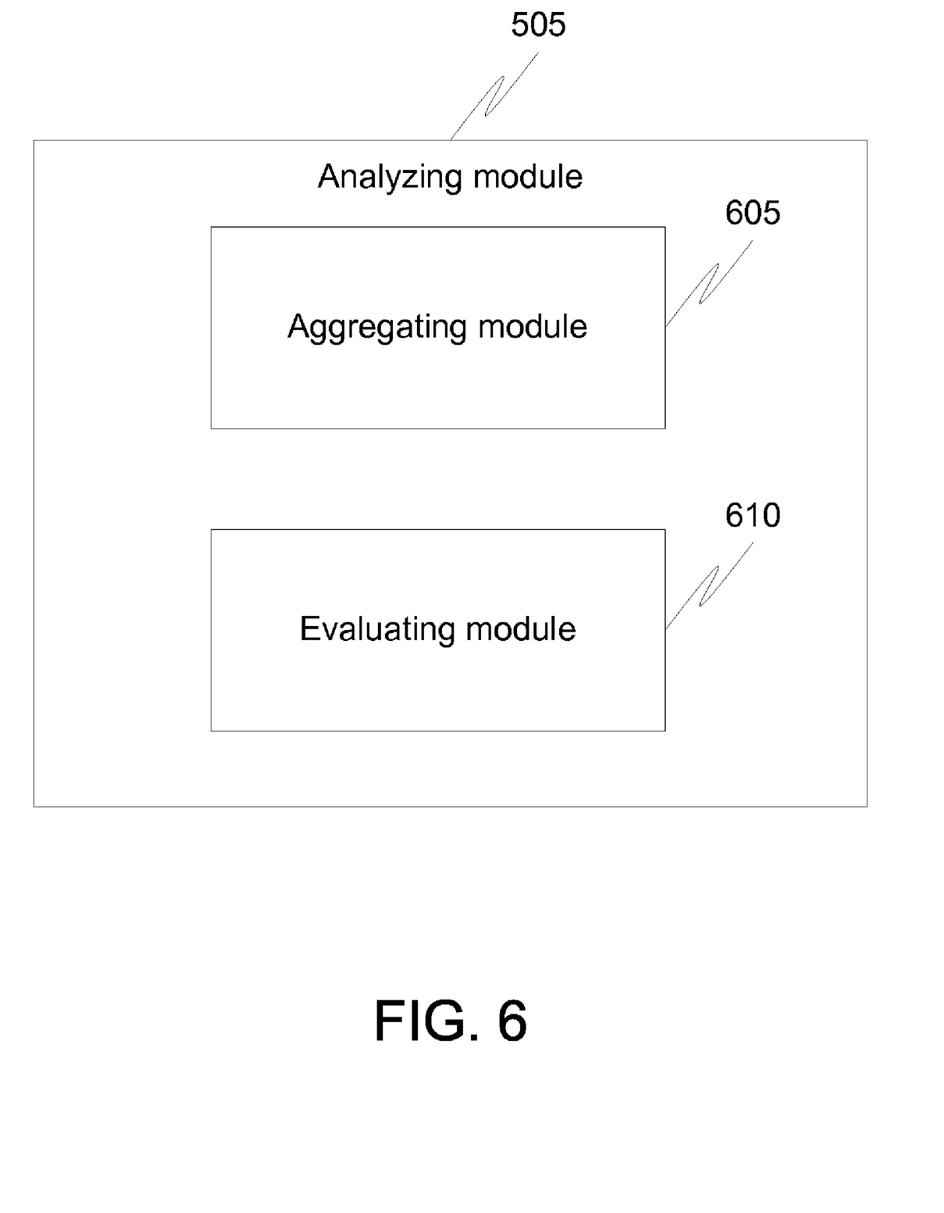
FIG. 6 illustrates a block diagram for an analyzing module in accordance with an embodiment of the present invention.

FIG. 6 illustrates a block diagram for the analyzing module 505 for analyzing the usage history corresponding to the services 120-135 accessed by the user of the communication device 115 in accordance with an embodiment of the present invention. The analyzing module 505 includes an aggregating module 605 and an evaluating module 610. In accordance with FIG. 5, the usage history corresponding to the services 120-135 accessed by the user is tracked by the tracking module 515. Further, the usage history tracked by the tracking module 515 is stored in the storing module 520. Thereafter, the aggregating module 605 aggregates the usage history corresponding to the services 120-135 accessed by the user of the communication device 115. The usage history corresponding to a service may be stored in a separate database corresponding to the service. The usage history corresponding to the services 120-135 stored in the one or more database corresponding to the services 120-135 is aggregated for obtaining an aggregated usage history. The aggregated usage history represents user activity at a plurality of temporal intervals. In an embodiment of the present invention, the communication service provider 105 maintains statistics of the usage history corresponding to the services 120-135 accessed by the user of the communication device 115. The statistics corresponding to the services 120-135 is aggregated so as to analyze user behavior and access pattern across the services 120-135 for generating the customized GUI that is optimized for easy and quick access to each of the services 120-135. The aggregated usage history is stored in an aggregated database. The aggregated usage history stored in the aggregated database may be automatically refreshed in response to an update of the usage history corresponding to the services 120-135 stored in the one or more database corresponding to the plurality of services. The aggregated usage history is further evaluated by the evaluating module 610. The evaluation of the usage history is done in order to customize the GUI of the communication device 115.

Figure 7:
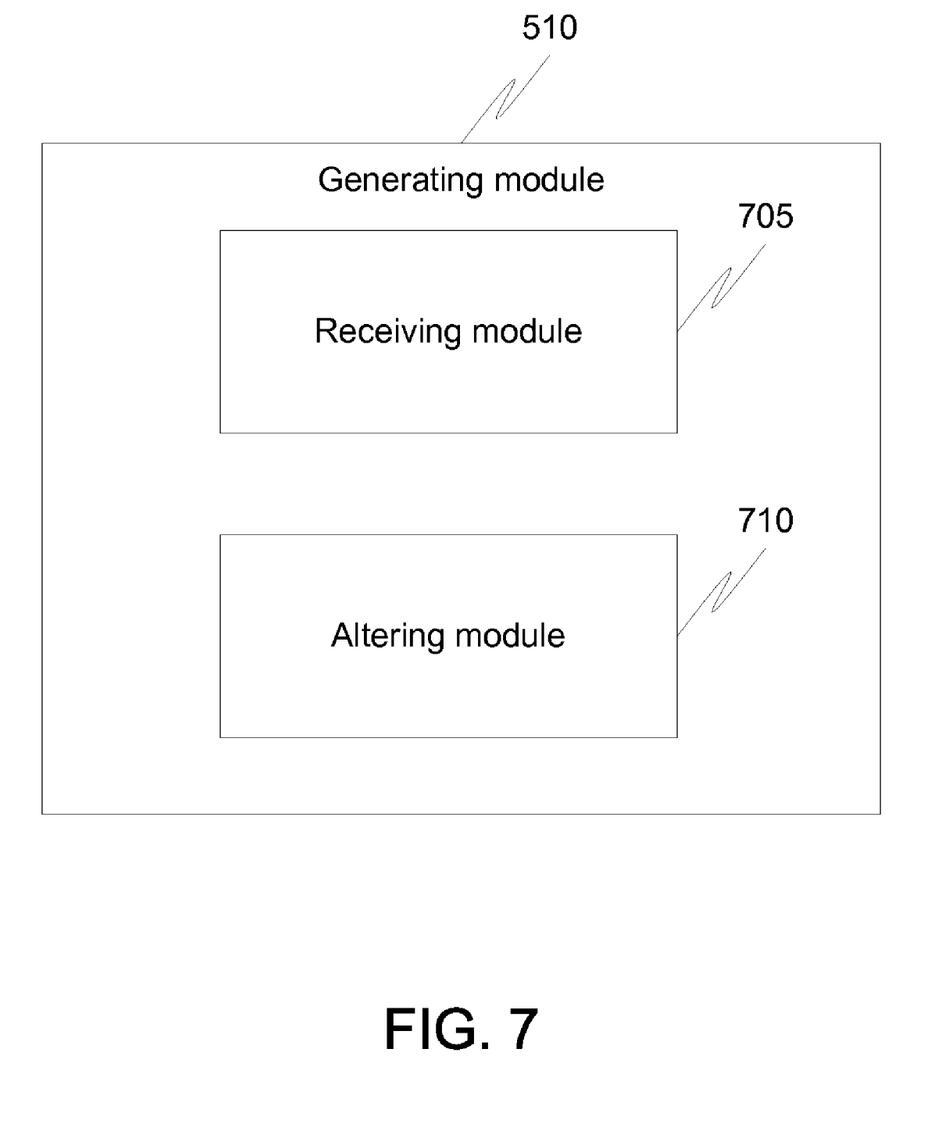
FIG. 7 illustrates a block diagram for a generating module in accordance with an embodiment of the present invention.

FIG. 7 illustrates a block diagram for the generating module 510 for generating the customized GUI based on analyzing the usage history of the communication device 115 in accordance with an embodiment of the present invention. The generating module 510 includes a receiving module 705 and an altering module 710. In accordance with FIG. 5, the customized GUI is transmitted to the communication device 115. The user may accept or reject the customized GUI based on the user's expectations and requirements of the GUI. The user may also provide feedback or propose changes to the customized GUI to meet the user's requirements. The user may provide feedback using one of the communication device 115, a simulation environment, such as, a desktop PC and other computing devices of the user configured to communicate with the receiving module 705. The receiving module 705 receives the user feedback corresponding to the customized GUI. Thereafter, the altering module 710 alters the customized GUI based on one or more of the user feedback and the predefined set of rules. As explained in conjunction with FIG. 2, the predefined set of rules may include, but not limited to, one or more of a set of rules specified by the manufacturer of the communication device 115, a set of rules specified by the communication service provider 105, a set of rules specified by the network access provider 110 and a set of rules specified by the user of the communication device 115. Upon alteration of the customized GUI, the user is prompted again for the customized GUI. The customized GUI is then transmitted or made available for the user to download.

Figure 8:
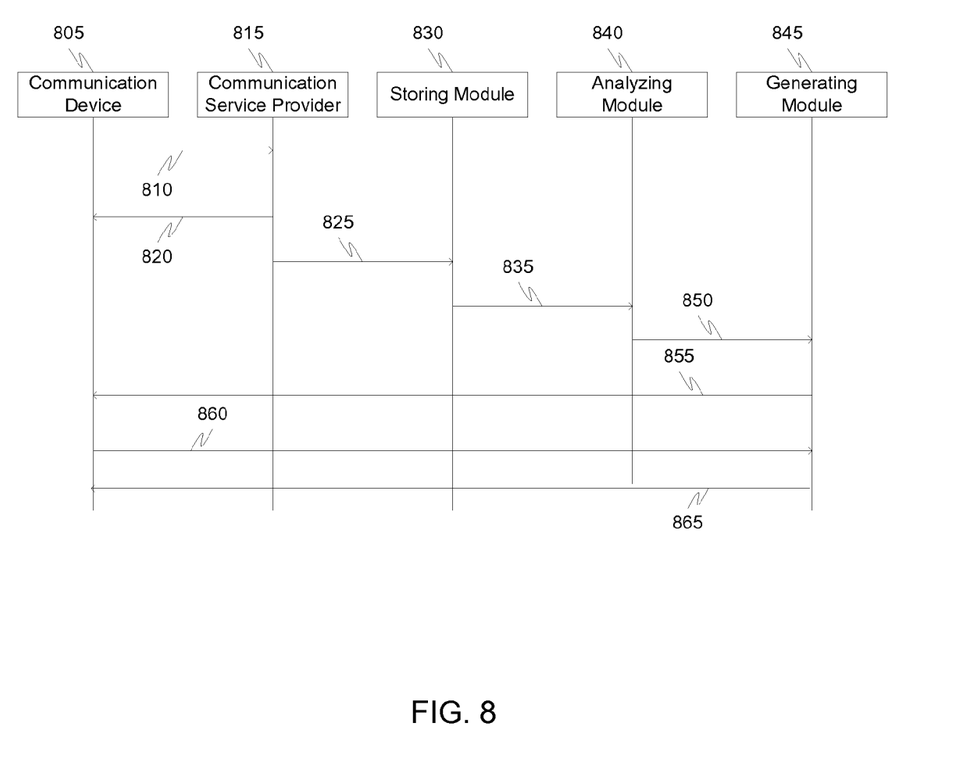
FIG. 8 illustrates a flow diagram of an exemplary embodiment for customization of a GUI of a communication device in a communication network.

Turning now to FIG. 8, a flow diagram of an exemplary embodiment for customization of a GUI of a communication device 805 in a communication network. The user uses the communication device 805 to access 810 services provided by a communication service provider 815. The services provided by the communication service provider 815 can be, for example, but not limited to, a voice call, text messaging, multimedia messaging, digital content access and downloading, internet access and various data applications. The user may have preferred services that are accessed more frequently as compared to other services. For example, the user may access internet more frequently as compared to text messaging on the communication device 805. The user may also exhibit a distinct interaction pattern while interacting with the services accessed by the user on the GUI of the communication device 805. The user, for instance, may frequently use a smile icon while messaging with a particular user. The communication service provider 815 tracks 820 usage history corresponding to the services accessed by the user of the communication device 805. The usage history includes the user preferences and the user interaction patterns corresponding to the services accessed by the user of the communication device 805. Upon tracking of the usage history, the usage history corresponding to the services accessed by the user of the communication device 805 is stored 825 in a storing module 830. In accordance with FIG. 3 and FIG. 5, the usage history corresponding to the services accessed by the user of the communication device 805 can be stored in one or more databases. The usage history corresponding to the services accessed by the user is updated at a predefined time interval. Further, the usage history corresponding to the services accessed by the user of the communication device 805 is aggregated for obtaining an aggregating usage history.

Thereafter, the aggregated usage history is analyzed 835 by the analyzing module 840. Upon analyzing, a generating module 845 generates 850 a customized GUI. As explained in FIG. 2 and FIG. 5, the customized GUI is further modified based on a predefined set of rules. The predefined set of rules may include one or more of a set of rules specified by the manufacturer of the communication device 805, a set of rules specified by the communication service provider 815, and a set of rules specified by the user of the communication device 805. The customized GUI is then transmitted 855 to the communication device 805. The user may accept or reject the customized GUI based on the user's expectations and requirements of the GUI. The user may also provide feedback 860 to the customized GUI to meet the user's requirements. The feedback may propose modifications to the customized GUI. After receiving the feedback, the generating module 845 alters the customized GUI based on one or more aspects of the user feedback and the predefined set of rules. The customized GUI is then transmitted 865 to the user of the communication device 805 to download. The customized GUI may be transmitted to the communication device 805 using OMA DM (Open Mobile Alliance Device Management) standard.

Various embodiments of the present invention provide methods and systems for customization of a GUI of a communication device in a communication network. The present invention provides personalization of the GUI based on the user preferences and the user interaction patterns pertaining to the services 120-135 accessed by the user on the communication device. Therefore, the GUI of the communication device is adapted according to the user needs and requirements. This enables better user experience while accessing various services on the GUI of the communication device. Also, the present invention facilitates customization of the GUI of the communication device based on constraints specified by the manufacturer of the communication device, the communication service provider, the network access provider, one or more applications accessed by the user and the user of the communication device Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for customization of a Graphical user interface (GUI) of a communication device in a communication network, the method comprising:

analyzing, by a communication service provider in the communication network, a usage history corresponding to a plurality of services accessed from the communication service provider by an user of the communication device, wherein the usage history comprises at least one of a plurality of user interaction patterns corresponding to the plurality of services accessed by the user and a plurality of user preferences corresponding to the plurality of services accessed by the user; and generating a customized GUI based on the analyzing of the usage history corresponding to the plurality of services accessed by the user of the communication device, wherein the customized GUI comprises placement of the plurality of services in a priority order defined by analyzing the usage history.

2. The method of claim 1, wherein generating further comprises:

modifying the customized GUI based on a predefined set of rules.

3. The method of claim 2, wherein the predefined set of rules comprises at least one of a set of rules specified by the manufacturer of the communication device, a set of rules specified by a communication service provider, a set of rules specified by the plurality of services and a set of rules specified by the user of the communication device.

4. The system of claim 1 further comprising tracking the usage history corresponding to the plurality of services accessed by the user of the communication device.

5. The method of claim 4, wherein tracking comprises:

storing the usage history corresponding to the plurality of services accessed by the user of the communication device in at least one database corresponding to the plurality of services.

6. The method of claim 1, wherein analyzing comprises:

aggregating the usage history corresponding to the plurality of services accessed by the user of the communication device stored in at least one database corresponding to the plurality of services; and evaluating the usage history in response to the aggregating of the usage history corresponding to the plurality of services accessed by the user of the communication device.

7. The method of claim 5 further comprising periodically updating the usage history corresponding to the plurality of services accessed by the user of the communication device stored in the at least one database corresponding to the plurality of services.

8. The method of claim 1 further comprising transmitting the customized GUI to the communication device of the user.

9. The method of claim 8, wherein the customized GUI is transmitted to the communication device in response to a user request.

10. The method of claim 8 further comprising transmitting the customized GUI to the communication device using Open Mobile Alliance (OMA) for Device Management (DM) standard.

11. The method of claim 1, wherein generating comprises:

receiving a user feedback corresponding to the customized GUI; and altering the customized GUI based on the user feedback.

12. A system for customization of a graphical user interface (GUI) of a communication device in a communication network, the system comprising:

an analyzing module, in a communication service provider in the communication network, for analyzing a usage history corresponding to a plurality of services accessed from the communication service provider by an user of the communication device, wherein the usage history comprises at least one of a plurality of user interaction patterns corresponding to the plurality of services accessed by the user and a plurality of user preferences corresponding to the plurality of services accessed by the user; and a generating module for generating a customized GUI based on the analyzing of the usage history corresponding to the plurality of services accessed by the user, wherein the customized GUI comprises placement of the plurality of services in a priority order defined by analyzing the usage history.

13. The system of claim 12, wherein the generating module further comprises:

a modifying module for modifying the customized GUI based on a predefined set of rules.

14. The system of claim 12 further comprising a tracking module for tracking the usage history corresponding to the plurality of services accessed by the user of the communication device.

15. The system of claim 14, wherein the tracking module comprises:

a storage module for storing the usage history corresponding to the plurality of services accessed by the user of the communication device in at least one database corresponding to the plurality of services.

16. The system of claim 12, wherein the analyzing module comprises:

an aggregating module for aggregating the usage pattern corresponding to the plurality of services accessed by the user of the communication device stored in at least one database corresponding to the plurality of services; and an evaluating module for evaluating the usage history in response to the aggregating of the usage history corresponding to the plurality of services accessed by the user of the communication device.

17. The system of claim 12 further comprising a transmitter module for transmitting the customized GUI to the communication device of the user.

18. The system of claim 12, wherein the generating module comprises:

a receiving module for receiving a user feedback corresponding to the customized GUI; and an altering module for altering the customized GUI based on the user feedback.

19. The system of claim 12, wherein the communication device comprises at least one of a mobile phone, a personal digital assistant (PDA), a landline phone, a laptop and a personal computer.

* * * * *